US006978376B2

(12) United States Patent
Giroux et al.

(10) Patent No.: US 6,978,376 B2
(45) Date of Patent: Dec. 20, 2005

(54) INFORMATION SECURITY ARCHITECTURE FOR ENCRYPTING DOCUMENTS FOR REMOTE ACCESS WHILE MAINTAINING ACCESS CONTROL

(75) Inventors: David Giroux, Sharon, MA (US); John Sharko, Sudbury, MA (US)

(73) Assignee: Authentica, Inc., Waltham, MA (US)

( * ) Notice: Subject to any disclaimer, the term of this patent is extended or adjusted under 35 U.S.C. 154(b) by 836 days.

(21) Appl. No.: 09/736,229

(22) Filed: Dec. 15, 2000

(65) Prior Publication Data

US 2002/0078361 A1  Jun. 20, 2002

(51) Int. Cl.[7] .......................... G06F 11/30; G06F 12/14; H04L 9/32
(52) U.S. Cl. ....................... 713/189; 713/167; 713/200; 713/201; 713/202; 713/193; 713/194; 380/277; 380/278; 380/279; 380/281; 380/284
(58) Field of Search ............................... 713/164–167, 713/193–194, 189, 200–201; 707/104, 100; 380/277–279, 380/282, 281, 284; 712/209; 705/57

(56) References Cited

U.S. PATENT DOCUMENTS

| | | |
|---|---|---|
| 4,605,820 A | 8/1986 | Campbell, Jr. |
| 4,937,863 A | 6/1990 | Robert et al. |
| 5,058,164 A | 10/1991 | Elmer et al. |
| 5,263,157 A | 11/1993 | Janis |
| 5,410,598 A | 4/1995 | Shear |
| 5,432,849 A | 7/1995 | Johnson et al. |
| 5,438,508 A | 8/1995 | Wyman |
| 5,440,631 A | 8/1995 | Akiyama et al. |
| 5,586,186 A | 12/1996 | Yuval et al. |
| 5,629,980 A | 5/1997 | Stefik et al. |
| 5,673,316 A | 9/1997 | Auerbach et al. |
| 5,689,560 A | 11/1997 | Cooper et al. |
| 5,708,709 A | 1/1998 | Rose |
| 5,727,065 A | 3/1998 | Dillon |
| 5,754,646 A | 5/1998 | Williams et al. |
| 5,765,152 A | 6/1998 | Erickson |
| 5,796,825 A | 8/1998 | McDonnal et al. |
| 5,809,145 A | 9/1998 | Slik et al. |
| 5,818,936 A | 10/1998 | Mashayekhi |
| 5,822,524 A * | 10/1998 | Chen et al. ................. 709/203 |
| 5,883,955 A | 3/1999 | Ronning |
| 5,933,498 A | 8/1999 | Schneck et al. |
| 5,956,034 A | 9/1999 | Sachs et al. |
| 6,002,772 A | 12/1999 | Saito |
| 6,064,736 A * | 5/2000 | Davis et al. ................. 713/155 |
| 6,182,220 B1 * | 1/2001 | Chen et al. ................. 713/182 |
| 6,289,450 B1 * | 9/2001 | Pensak et al. .............. 713/167 |
| 6,308,256 B1 * | 10/2001 | Folmsbee .................... 712/209 |
| 6,499,106 B1 * | 12/2002 | Yaegashi et al. ............ 713/193 |
| 6,711,553 B1 * | 3/2004 | Deng et al. .................... 705/57 |
| 6,732,106 B2 * | 5/2004 | Okamoto et al. ........... 707/100 |
| 2001/0055396 A1 * | 12/2001 | Jevans ........................ 380/282 |

\* cited by examiner

Primary Examiner—Ayaz Sheikh
Assistant Examiner—Longbit Chai
(74) Attorney, Agent, or Firm—Steptoe & Johnson LLP (57) ABSTRACT

A method of controlling distribution of a segment of encrypted electronic information is presented. A key server receives a protected copy of a decryption key for the segment. The segment is retrieved at a user location. The protected copy of the decryption key is accessed. In response to the accessing, the segment is decrypted using the accessed copy of the decryption key at the user location. The accessed copy of the decryption key is destroyed at the user location in response to the decrypting. The decrypted segment is displayed in response to the decrypting. The decrypted segment is destroyed in response to the displaying.

21 Claims, 3 Drawing Sheets

INFORMATION SECURITY ARCHITECTURE FOR ENCRYPTING DOCUMENTS FOR REMOTE ACCESS WHILE MAINTAINING ACCESS CONTROL

BACKGROUND

This invention relates to an electronic security system for electronic objects such as documents, video and audio clips and other objects that can be transmitted via a network.

Electronic security systems have been proposed for managing access to electronic information and electronic documents so that only authorized users may open protected information and documents. Several software tools have been developed to work with particular document readers such as Adobe Acrobat Exchange and Adobe Acrobat Reader.

A need still exists for improved systems for providing access to encrypted information by authorized users and which prevent unauthorized users from gaining access to the encrypted information. The present invention allows the authoring user or other controlling party to maintain access control over the electronic information.

SUMMARY

The preferred embodiment(s) of the invention are summarized here to highlight and introduce some aspects of the present invention. Simplifications and omissions may be made in this summary. Such simplifications and omissions are not intended to limit the scope of the invention.

According to an embodiment of the present invention, a remote key server stores decryption keys for encrypted electronic information. When a user location is logged into the key server, the key server will send an authorized user a copy of a decryption key necessary to decrypted a segment of electronic information at the user location; preferably, the decryption key is never saved at the user location and cannot thus be copied or duplicated at the user location. A user can also request to lease the key, for which the key server will send an authorized user a protected copy of the decryption key for storage at the user location. The protected copy preferably becomes unusable after the expiration of a lease period.

These and other objects will become apparent from the figures and written description contained herein.

BRIEF DESCRIPTION OF THE DRAWINGS

Preferred embodiment(s) of the invention will be discussed below with reference to attached drawings in which.

DETAILED DESCRIPTION OF THE PREFERRED EMBODIMENTS

Figure 1:
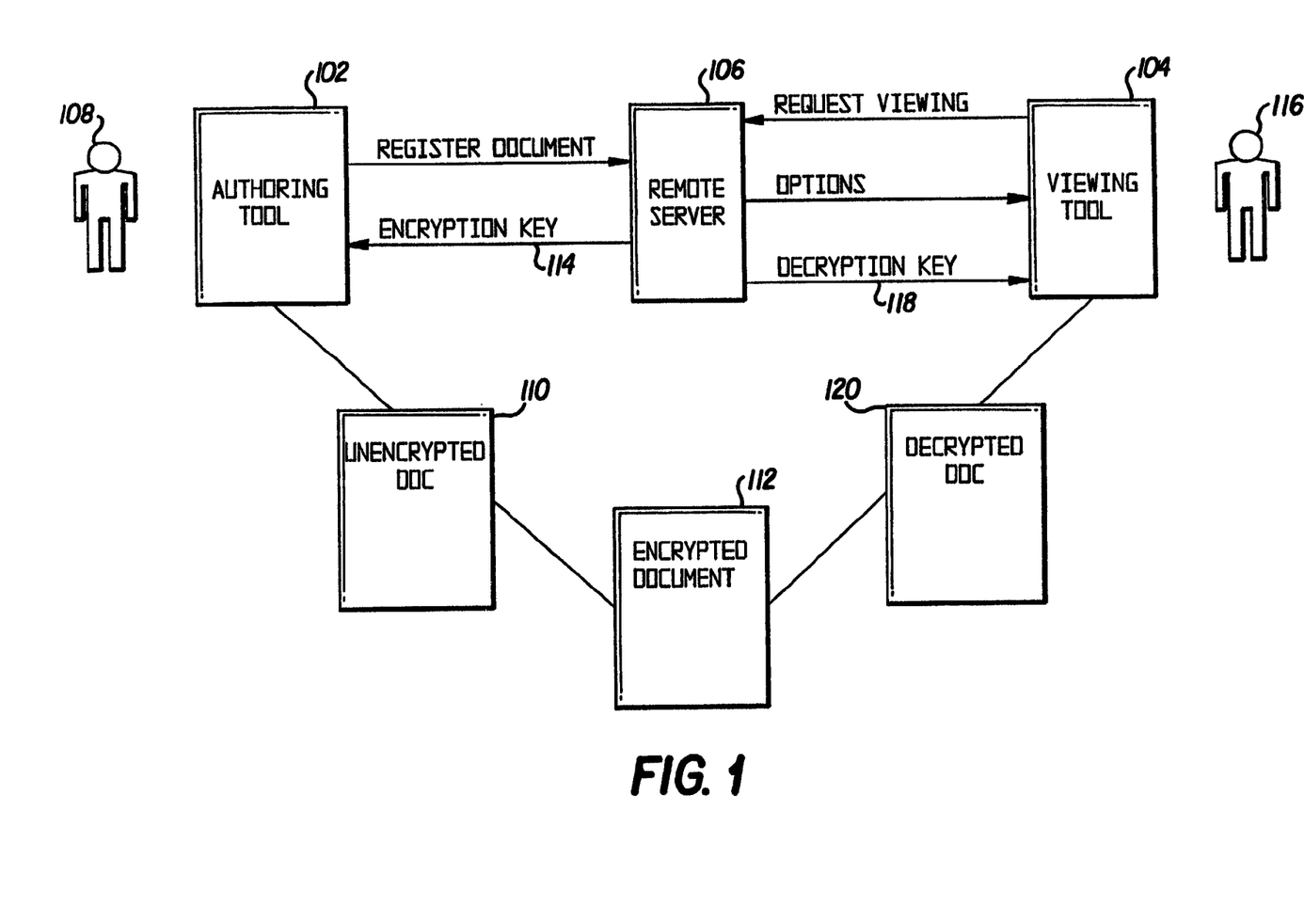
FIG. 1 is a block diagram illustrating a system configuration of an authoring tool, a viewing tool, and a remote server of the electronic encryption system.

Referring now to the Figures wherein like reference numerals indicate like elements, in FIG. 1, the system of the preferred embodiment can be broken down conceptually into three functional components: an authoring tool 102, a viewing tool 104, and a remote server 106. For convenience, the embodiments described herein are described with respect to a document in Adobe Acrobat Exchange, but other base software packages may be used.

Various types of electronic information, as determined by the base software package chosen, can be encrypted using the present invention. By way of non-limiting example, and for purposes of convenience and clarity, the preferred embodiment will be discussed below with reference to text-based documents. However, the invention is not so limited, as the invention herein may be used in conjunction with any type of video, audio, pictorial, or electronic data.

The authoring tool 102 allows an authoring user 108 to convert an unencrypted document 110 to an encrypted document 112 using a strong encryption algorithm and an encryption key 114, or set of encryption keys 114, provided by the remote server 106. The authoring tool 102 registers the electronic document or information with the remote server 106, and preferably associates a set of access policies with the encryption key so that only selected viewing users 116 under selected circumstances may view the document. The document or information may also be broken down into sections using the authoring tool 102, so that certain sections within a document may have different keys and/or access policies. For example, a set of users may be allowed to view pages 1–5 of a 10-page document, while a subset of those users may be allowed to view all 10 pages of the document. Sections of the document 110 can also remain unencrypted, or encrypted but accessible to all users.

The authoring tool 102 also allows the authoring user 108 to establish access policies that block certain functions normally accessible by the viewing user 116. For example, the authoring user 108 may deny a viewing user 116 privileges such as printing and copying of the clear text. The authorizing tool may also establish access policies based on time or location, e.g., the document 110 may only be accessed during a certain time interval on certain computers.

The viewing tool 104 allows an authorized viewing user 116 to decrypt the encrypted document 112. Authorization for viewing user 116 preferably derives from an access policy associated with the decryption key 118. If an authorized user requests the decryption key 118 under authorized condition, the viewing tool 104 retrieves the decryption key 118 associated with the encrypted document 112 from the remote server 106 and decrypts the document section to produce decrypted document 120. Viewing tool 104 loads the resulting clear text into the display buffers to render the document section on a display, destroys the decryption key, and clears the display buffers to destroy the clear text version of the document section. The clear text will thus be visible on the display, but will not exist in electronic form in a manner that can be copied or manipulated.

The viewing tool 104 prevents the saving of the decryption key or the clear text version of the document. The viewing tool 104 also blocks the viewing user's machine from performing certain functions, such as printing or copying, as directed by the authoring user 108 during registration of the document 110.

The secure remote server 106 performs several functions. The remote server 106 generates encryption keys 114 for each document section, maintains decryption keys 118 for registered encrypted documents 112, authenticates requests for viewing a document section, grants access to registered documents 112 by providing decryption keys 118 and associated access policies to authorized viewing users 116, and maintains an encrypted secure central database which provides association between registered authoring users, registered documents, associated decryption keys, associated policies for each document, options for each user and document, and associated registered viewing users. The remote server 106 does not store or receive the actual document, either encrypted or unencrypted.

Figure 2:
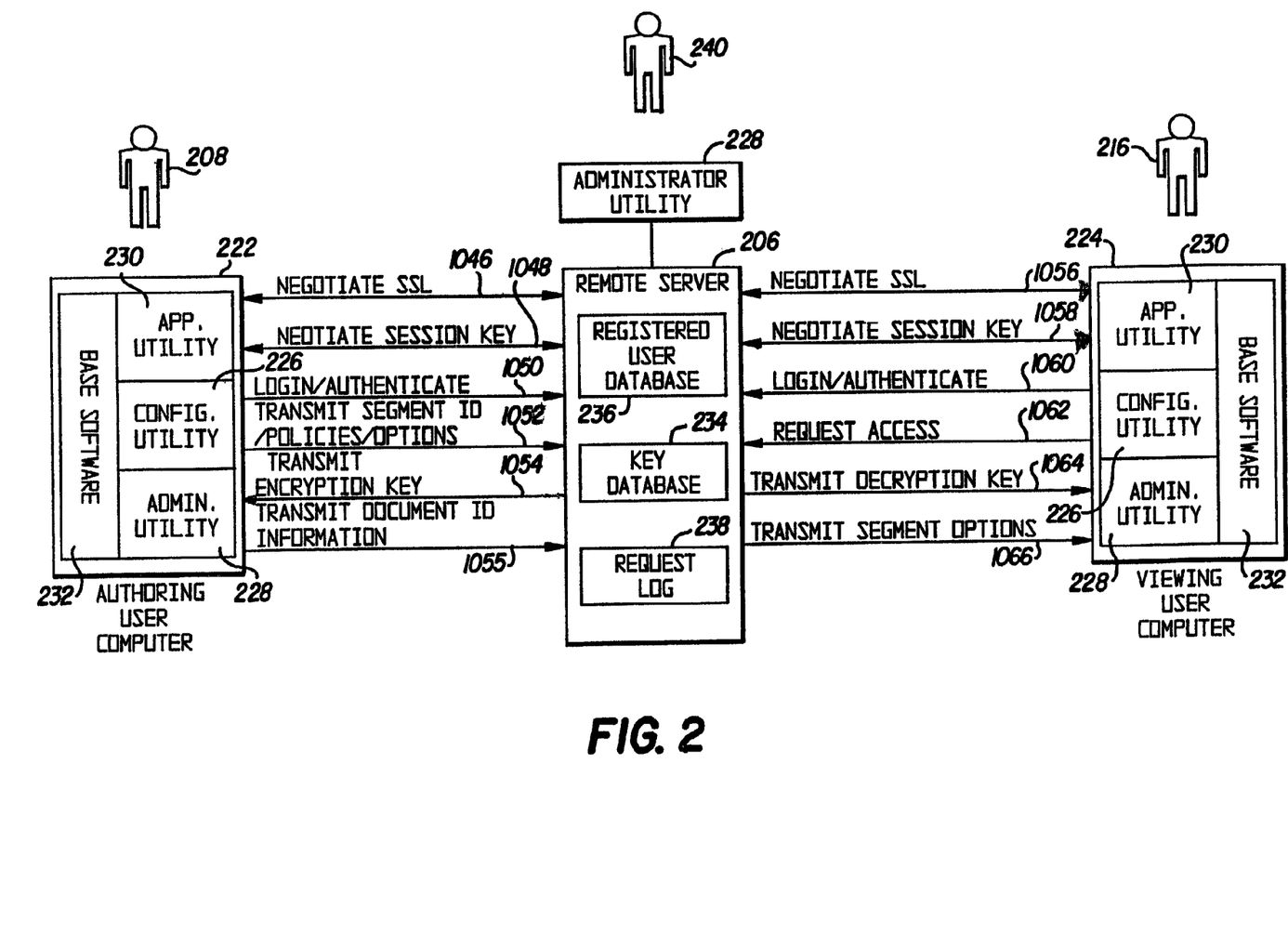
FIG. 2 is a block diagram illustrating a detailed system configuration and functions associated with each component of the electronic encryption system.

The authoring tool 102 and the viewing tool 104 each use essentially the same suite of software tools. As shown in FIG. 2, the software tools reside on the authoring and viewing users' computers 222, 224. Registration with the central remote server 206 determines which functions within the suite of software tools are available to a particular user. The software tools include a Configuration Utility 226, an Administrator Utility 228, and an Application Utility 230. In the embodiment using Adobe Acrobat Exchange, the Application Interface is a "Plug-In," which uses SDK and Plug-In Standard Interface. The three software tools run in conjunction with base viewing or playback software 232, such as Adobe Acrobat Exchange, a web browser, a word processor, an audio or video playing application, a custom data processing, or a specialized low-level device driver, such as a hard disk driver, video driver, or audio driver. The base software package 232 will depend on the type of data stream to be encrypted/decrypted.

The Secure Remote Server

The secure remote server 206 is a server that is remote from an authoring or viewing user 208, 216. The server 206 maintains a database 234 of encryption keys and associated decryption keys for distribution to registered or authorized users. The remote server 206 also maintains a database which associates registered document sections, which are identified by unique section IDs, with authoring users, user access profiles, document access policies and options, and associated encryption/decryption keys. The remote server 206 does not actually store registered documents or sections, but instead relates identifying information about a document to the associated information.

The remote server 206 also tracks and maintains records of requests to view documents and to obtain document decryption keys 238. The records may be used to monitor the system for suspicious activity. For example, a single user requesting the decryption key for a document several times during a specific time period might be an indication of suspicious activity. The server can then provide an alert message to a pager, email or fax, thus allowing timely investigation of the activity. The request information may also be used for the purposes of non-repudiation or as a basis for billing in situations where access to the system or access to protected information is being sold.

All communication between the remote server 206 and a user's computer 222, 224 is encrypted using Secure Socket Layer (SSL) protocols. Once an SSL tunnel has been negotiated between a user's machine 222, 224 and the secure server 206, a session key is negotiated. Thus, communications to and from the secure server 206 and a user's computer 222, 224 are doubly encrypted.

Registration with the remote server 206 of a user or automated system wishing to use the system is done separately from any communication for registering a document or viewing a document. A user wishing to register documents for viewing by other users, or viewing registered document registered by other users, must contact the server independently, possibly through a separate human Coordinator 240 or separate network link which can collect payment for the authoring, viewing, and other services, can verify the identity of the user and provide the server with user identification information and user authorization profiles.

The server may be a single server, a set of synchronized servers, or dual servers with a shared database.

The Configuration Utility

The Configuration Utility 226 defines a local user (authoring or viewing) on the user's computer 222, 224. The Configuration Utility 226 establishes the communication parameters for a local user and the remote server 206. For example, the Configuration Utility 226 will query the user to define a local user profile, to include name, password and other identifying information. This local user profile must match the information provided by a user to the Coordinator 240 at the remote server 206.

The Configuration Utility 226 is also responsible for maintaining information regarding the authentication and secure communication method used by the local user, for example, certificate, secret passphrase, smart card, etc. The Configuration Utility 226 maintains information about the local user's secure communication method, for example, the certificate and certification authority for a certificate based secure communication system.

The Administrator Utility

The Administrator Utility 226 is a network client application used by the human Coordinator 240 and other users to control access to documents selected for encryption by defining policies associated with a document. The Administrator Utility 228 is a software program residing on the user's computer 222, 224. The Coordinator 240 or authoring user 208 uses the Administrator Utility 228 to define policies related to a particular user. For example, the Coordinator 240 can use the Administrator Utility 228 to control the functions available to a particular authoring user 208, which might depend on the fees paid by the authoring user 208, or the Coordinator 240 can control the amount of access an authoring user 208 can allow to viewing users 216. Other policies that an individual can define using the Administrator Utility 228 are site policies, group policies, and default policies.

The Administrator Utility 228 allows the Coordinator 240 or authoring or viewing user 208, 216 to determine what documents have been registered by a particular user by accessing the registered user database 236. The Administrator Utility 228 also allows an authoring user to permanently disable the viewing of documents by deleting the associated decryption key from the server. The Administrator Utility 228 also allows an authoring user 208 to initially define the policies related to his documents and to change the policies after the documents have initially been registered.

The Administrator Utility 228 allows a normal authoring user 208 to create, edit, and delete time windows, network specifications and policy templates; view the list of registered documents; and view and edit the policies of documents that are registered. The Administrator Utility 228 allows the Coordinator 240 to create, edit, and delete users and user policies; create, edit, and delete groups of users and group polices; create, edit, and delete document groups and document group policies; define and modify the Site and Default polices; create, edit, and delete document override policies; and view the activity log and set up notification policies

The Application Interface

The Application Utility 230 of the preferred embodiment is a standard "Plug-In" to Adobe Acrobat Exchange using SDK and Plug-In Standard Interface. The Plug-In 230 provides a user screen interface to allow the user to access the particular functions associated with registering and viewing documents and communicating with the server. The Plug-In Screen may be integral to the Adobe User Interface Window or may be a separate window. In the preferred embodiment, the Plug-In 230 modifies the Adobe User Interface Window by adding functional "buttons" such as register, create policies, tag, encrypt, view and decrypt.

The Plug-In 230 allows encryption and decryption of PDF files using encryption keys from the remote server 206. The Plug-In 230 connects to the server 206, authenticates the user to the server, registers documents with the server, selects policies at the server as they have been defined by the authoring user 208 using the Administrator Utility 228.

In addition, the Plug-In 230 blocks certain functions at the viewing user's computer 224 that are otherwise available in Adobe Acrobat Exchange. For example, if the authoring user 208 has limited access to a document so that a viewing user 216 is prohibited from printing a viewed document, the Plug-In 230 temporarily disables the print function of Adobe Acrobat Exchange. Among the functions that the Plug-In 230 can disable are print, copy, cut, paste, save, and other functions. Other functions may be disabled or limited as appropriate for the type of file viewed and the access level. The Application Utility 230 is designed in such a way that it does not disclose either the decryption key or the clear text or unencrypted representation of the protected information content in electronic form.

The Graphical User Interface

The Graphical User Interface ("GUI") supports standard user interface objects such as push buttons, text input fields, lists, menus, and message boxes. The mouse and keypad control the GUI. The GUI has multiple windows that allow real time setup of server configuration such as who may register a document, who may view a document, when a document may be viewed and on which host the document key and viewing information resides.

Initial User Setup

A user who wishes to register or to access information must first register and be recognized by the server 206. The user 208, 216 contacts the server 206 independently, possibly through a separate human Coordinator 240 or separate network link which can collect payment for the authoring, viewing and other services; verify the identity of the user; and provide the server with user identification information and user authorization profiles. Once the user 208, 216 is registered with the server 206, the suite of software tools is provided to the user.

The user must have installed the base software 232, such as Adobe Acrobat Exchange, on his computer. The user then installs the Application Utility 230 provided by the Coordinator 240, as well as the Administrator and Configuration Utilities 228, 226. In one embodiment, upon running the Application Utility 230, the Application Utility 230 will install the Administrator and Configuration Utilities 228, 226 on the user's machine.

Creating Policies Using The Administrator

Once a user 208, 216 is registered and the Configuration Utility 226 has set up identification and encryption information for the user 208, 216, the user authorized to do so can use the Administrator Utility 228 to create policies associated with a specific document. An authoring user 208 wishing to register a document creates policies to define who, when and how a document may be viewed or otherwise accessed.

The authoring user 208 runs the Administrator Utility 228 which has been installed on his machine 222 and instructs the Administrator Utility 228 to create policies for a document. The Administrator Utility 228 will request the information provided during set up to the Configuration Utility 226 such as username, passphrase, and method of authentication to verify the user's identity. The Administrator Utility 228 will also ask on which server the authoring user 208 wishes to register his document. The Administrator Utility 228 will then establish a connection to the remote server through the Application Utility 230.

The remote server 206 and the authoring or viewing user's computer 222, 224 communicating with the server 206 will negotiate a standard Secure Socket Layer (SSL) encryption tunnel, as represented in FIG.2 by reference numerals 1046, 1056.

Once the SSL tunnel is established, the user's computer 222, 224 and the server 206 negotiate a secondary session key, as represented in FIG.2 by reference numerals 1048, 1058. All subsequent communications is additionally encrypted using 128-bit RC4 and this secondary session key. All communication between the users' computers 222, 224 and the server 206 is thus doubly encrypted.

Once the doubly encrypted communication link is established between the authoring user's computer 222 and the server 206, the authoring user's computer 222 provides login and authentication information 1050 to the server 206. The server 206 authenticates the authoring user's 208 identity and verifies that the authoring user 208 has authority to use the system by checking a database of registered users 236 maintained on the server. The information provided by the authoring user 208 to the Configuration Utility 226 is compared to the information provided by the user to the Coordinator 240 during the independent user registration process. The database 234 contains all of the access controls related to a particular user, so that if a user is only authorized to view documents, he will not be allowed to use the system to register or encrypt documents.

After the server 206 authenticates the authoring user 208 and verifies that the authoring user 208 is authorized to register documents, the Administrator Utility 228 allows the authoring user 208 to create policies applicable to a particular viewing user 216, a group of viewing users, or a default policy for all other users. The policies 1052 are then communicated to the server 206. Policies define who may view a document, when, and under what conditions. Combining a set of constraints including allowable or denied users and groups, time ranges, and Internet Protocol (IP) addresses creates policies. Access to a document by a viewing user 216 is preferably determined by combining the user policy, document policy, as well as possibly the group policy and server document restrictions. If the Coordinator 240 has created a document override policy for a document, then the override takes precedence over the regular document policy defined by the authoring user. Policies include limiting who may view a document or portion of a document and the time frame during which a user may view the document.

The Administrator Utility 228 also allows the authoring user 208 to create options. Options specify what functions of the base software 232 are temporarily disabled so that the viewing user 216 is prohibited from accessing them while viewing the document. An option can also enforce a watermark on printing. For example, the authoring user 208 can prohibit a particular viewing user 216 from printing, saving, or copying a particular document or portion of a document. The authoring user 208 using the Administrator Utility 228 defines these Options, but the options are enforced by the Application Utility 230.

Encrypting Documents and Data Streams

An authoring user 208 wishing to encrypt a document will open the document on his computer 222. The Application Utility 230 must also be loaded before the document or information can be encrypted. In the preferred embodiment, the Plug-In 230 adds menu items to the menu bar in Adobe Acrobat Exchange such as "tag" and "encrypt." "Tag" allows the authoring user 208 to select sections of the document to be encrypted. The authoring user 208 can assign different policies to different tagged sections of a single document, i.e., policies are associated with sections. A section may consist of any subset of the entire document or the entire document. Once the document has been sectioned or "tagged," the authoring user selects "encrypt" from the menu bar. If the authoring user 208 has not already logged into the remote server 206, the Plug-In 230 will force a log in to the remote server 206 through the Administrator Utility 228. A log-in screen is provided and the authoring user 208 must log-in to the server 206. The server 206 authenticates the authoring user 208 and verifies that the authoring user 208 is authorized to register documents.

Once the authoring user has been authenticated, the authoring user is asked to associate the overall document with a policy, and this information is communicated to the remote server 206. This policy becomes the default policy for any portions of the document that are not tagged and associated with a specific policy. The Plug-In 230 assigns a unique section ID for each tagged section after the authoring user has tagged all sections and has instructed the Plug-In 230 to go ahead with the encryption. The Plug-In 230 transmits the section IDs to the server 206. The server 206 generates a random encryption key for each section ID and communicates the encryption key to the authoring user's computer 222, 1054. The server 206 stores the section ID, the key associated with the particular section ID, and the policy associated with a particular section ID in the central database 234, and then transmits the key to the Plug-In 230 at the authoring user's computer 222. The Plug-In 230 at the authoring user's computer 222 encrypts the section, immediately destroys or removes the key from the authoring user's machine 222, and then deletes the clear text for the section from the Plug-In 230. Thus, key lifetime is very short on the authoring user's machine. The encryption key is never stored on the authoring user's machine where it is accessible, such as the hard disk. The key can even be obfuscated while in the memory of the authoring user's machine. The duration of the key's existence depends on the speed of the computer that actually performs the encryption, since the key is destroyed immediately after the encryption. In the preferred embodiment, 128-bit RC4 is used for document and section encryption.

Once all sections have been encrypted, the Plug-In 230 produces a hash of the entire document and sends the hash to the server as document identification, 1055. The server 206 stores the hash with the keys associated with the document. Thus, the document is never transmitted to the server 206, only the section IDs and hash.

A pop-up window asks the authoring user 208 where he wishes to store the encrypted document. By default, the encrypted document overwrites the clear text document on the authoring user's machine 222.

Viewing, Replaying, and Decrypting

A user wishing to view a document must have installed the Configuration Utility 226, Administrator Utility 228, and the Application Utility 230 on his computer 224. The viewing user 216 must be independently registered with the Coordinator 240 as a user. The viewing user 216 must also have installed the base software application 232 for viewing the document, such as Adobe Acrobat Exchange. The viewing user 216 must enter the Configuration Utility 226 and provide user set up information.

If the viewing user 216 has not opened the Configuration Utility 226, the Administrator Utility 228 and the Application Utility 230, these programs will automatically be opened once the information to be accessed has been selected, and the system has recognized that the information is encrypted.

Once the Configuration Utility 226 has opened, it will request the user to provide information defining the viewing user 216. If the viewing user 216 is a new user, the viewing user 216 will select a button on the Configuration Utility's interface window indicating that a new user profile needs to be provided. The Configuration Utility 226 will provide a query screen to the user and the user will input identification information, such as a user name. The identification information will be checked against the information provided to the server 206 or Coordinator 240 during the independent user registration process.

The Application Utility 230 will check to see if the user is logged onto the remote server 206. If the viewing user 216 has not logged onto the remote server, the Application Utility 230 provides a pop-up window so that the user can log in to the server. An SSL tunnel and session key are negotiated, 1056, 1058. The viewing user's computer 224 provides login and authentication information to the server 206, 1060. Once logged into the server 206, the Application Utility 230 requests access to the document or information 1062 by asking the server 206 for the decryption key for the first section of the document or information to be accessed. The server 206 uses the section ID to check the database to find the policies associated with the section and thus to determine whether the viewing user 216 is authorized to access this section or the document as a whole.

If the viewing user 216 is not authorized to access the section, the viewing user 216 is so informed. If the user 216 is authorized to access the section, the server 206 sends the decryption key and options for that section to the Application Utility 230 at the viewing user's computer 224 and the Application Utility 230 decrypts the section using the decryption key. After decrypting the section, the Application Utility 230 immediately discards/destroys the key, loads the decrypted section into the display buffers to renders the decrypted section to the screen, and then clears the buffers to destroy the decrypted version of the section. When the viewing user moves to a different section, the process is repeated.

The Application Utility 230 enforces the options that were assigned by the authoring user 208 to the section viewed by the viewing user 216. For example, if the authoring user 208 assigned that the viewing user 216 cannot print the clear text document or section, then the Plug-In 230 disables the print function of Adobe Acrobat Exchange while the clear text document or section is available to the viewing user 216. Other functions that can be controlled or disabled by the Plug-In 230 are save, copy, paste, and print with watermark. For other base software packages 232 such as audio, the functions controlled by the Application Utility 230 could be play, copy, and save unencrypted. Thus, using the options, the viewing user 216 has no ability to permanently acquire the clear text document or data.

The Database

The secure central database 234 resides on the remote server 206. It may be a distributed or shared database residing on multiple remote servers 206. In the preferred embodiment the database 234 is maintained in Berkley DB software. All records maintained in the central database 234 are encrypted and the database is password protected. The Coordinator 240 controls the database 234 and has access to the database 234 using the password.

All keys for encryption and decryption are maintained in the database 234. The database 234 provides a structure for associating section IDs with an associated decryption key, policies for accessing that section, and options for accessing that section. The authoring user 208 may change a policy associated with a section ID through the Administrator Utility 228 on his computer. The change in policy is communicated to the remote server 206 and the database 234 is updated accordingly. The update policy function allows an authoring user 208 to revoke access to a section or document by a user or group of users.

The authoring user 208 can destroy the decryption key or the association of a decryption key to a section or document on the database 234 using the Administrator Utility 228. By destroying the decryption key or the association of the decryption key with a Section or Document, the authoring user 208 destroys the ability to decrypt the information, effectively shredding all copies of the information.

The authoring user may also authorize the remote server to destroy the key after the expiration of a predetermined time, thereby placing a limited lifespan on the associated document. When the remote server destroys the keys after the predetermined time, all copies of the associated document becomes permanently inaccessible absent accessing of the underlying encryption algorithms. This feature prevents old backup copies of the document from unexpectedly emerging at a later date.

Regular backups of the database 234 can be made without shutting down the whole database 234.

Remote Access

Figure 3:
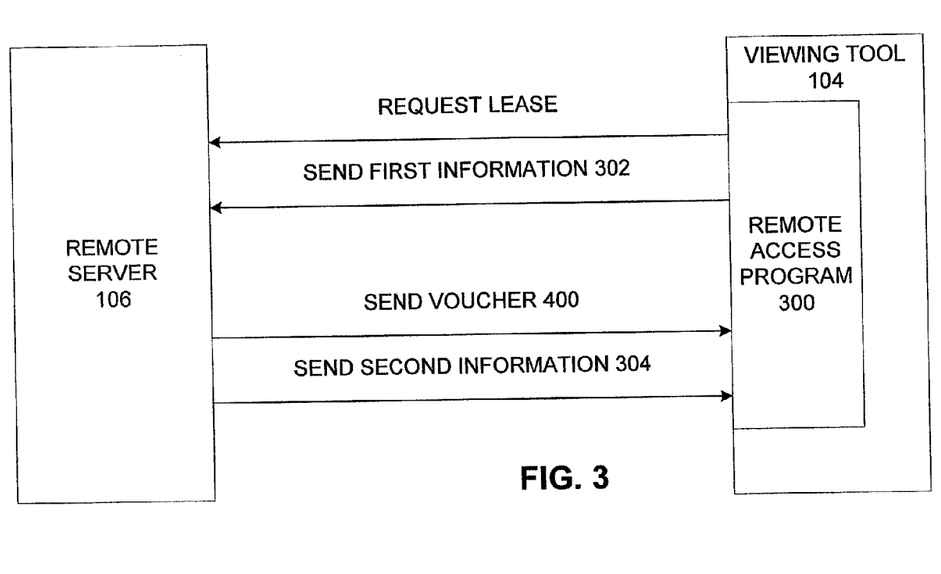
FIG. 3 is a block diagram illustrating a system configuration of an embodiment of the invention an authoring tool, a viewing tool, and a remote server of the electronic encryption system with lease capabilities.

Referring now also to FIG. 3, the user 116 preferably connects to the remote server 106 to receive the key 118 to decrypt document 112. However, if the user 116 is unable to connect directly to the remote server 106, then the user 116 may access a "leased" key 118 from a remote access program 300 in viewing tool 104. Remote access program 300 is preferably part of the Administrative Utility 228 in the user computer 224, although it may be completely or partially part of other utilities.

Figure 4:
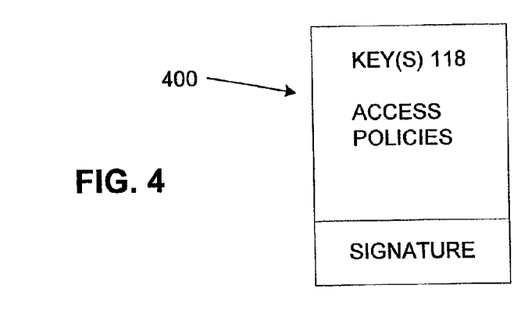
FIG. 4 shows the contents of a voucher.

To obtain a leased key 118, the user 116 enters a lease request for a voucher 400 at the viewing tool 104 (i.e., at the user computer 224) for an encrypted document 112. The user request preferably specifies a preferred time period for the lease, and may also enter a reason for the request.

Once the user enters the request, the remote access program 300 generates a first information 302 that is preferably unique to the viewing tool 104. Preferably, the first information 302 represents various identification numbers from the components of the user computer 224 (machine ID, network card, etc). Such information may alternatively be based on one or more of identification numbers of computer elements, random data (e.g., numbers or tables), fixed data (e.g., numbers or tables), and/or other information.

The user computer 224 preferably encrypts the first information 302, and sends the encrypted first information 302 with the lease request to the remote server 106.

Upon receipt of the lease request, the remote server 206 determines whether a key lease is proper. Non-limiting examples of reasons that the remote server 206 may decline to issue a lease include: the particular remote server 106 does not allow for leases; the user does not have general authorization to lease keys; the user does not have specific authorization to lease or otherwise access a key for the associated document 112; the document 112 is not authorized for a lease; and/or the reasons for the lease are not valid for this document, user, or server. The foregoing limitations may be based on restrictions on a particular remote server 106, access policies associated with the document 112 for which the lease is requested, and/or restrictions on a particular user 116.

Referring now also to FIG. 4, if the remote server 106 authorizes a key lease for the document 112, it retrieves the associated key(s) 118 and access policies from its various databases and combines the same into a voucher 400. The keys 118 are for the document 112 or portion of the document 112 for which the user has authorized access. Remote server 106 will preferably not insert keys in voucher 400 for which the user is not authorized. Not limiting examples of access policies include an ID for the associated encrypted document 112, watermarks and associated text, limitations on the encrypted document 112 (e.g., printing limitations, copy limitations), etc.

The access policies preferably include a time frame over which the lease is valid. The time frame is preferably the smaller of the requested time frame, a maximum time frame allowed for the particular user, document, or server. However, other time frames as appropriate may be used. By way of non-limiting example, the access policy may include an allowable access time, a checkout time, number of permissible accesses, total access time, times that the voucher or segment can be accessed, logon time constraints, etc. The time limit(s) can thus authorize access for certain days (e.g., Monday through Friday), specific dates (May 1 through May 15), and/or times with certain days or specific dates.

Remote server 106 generates a protection function to protect the contents of voucher 400. Preferably, this protection function is a standard encryption algorithm, such as 3DES, for which the decryption key is derived from the first information 302 and a second information 304 generated by the remote server 106. The second information 304 is preferably based on one or more of random data or fixed data (e.g., numbers, tables, or shared secrets). In the alternative, other types of protection functions and/or encryption techniques may also be used.

After protecting voucher 400 with the protection function, remote server 106 signs the protected voucher 400 and sends it along with the second information 304 to the viewing tool 104/ user computer 224. The remote access program 300 stores the information, while remote server 106 logs receipt of the voucher 400. The user computer 224 may also verify the signature on the voucher 400 before accepting the same.

Since the protection function is derived from both the first and second information 302 and 304, the second information 304 is preferably in and of itself insufficient to break the protection function. Should an attacker intercept the second information 304 and protected voucher 400, the attacker would not be able to use the second information 304 alone to access the protected voucher 400.

When the user 116 requests access to the encrypted document 112, the viewing tool 104 initially attempts to log onto the remote server 106 to obtain the key 118. If the log on fails, the viewing tool 104 attempts to log onto the remote access program 300. The system then performs a security check to confirm that all plug-ins are trusted, and will abort the procedure if they are not.

The user then requests access to the encrypted document 112. The remote access program 300 identifies the voucher 400 associated with the encrypted document 112. Using the first information 302 and the second information 304 (from remote server 106), the remote access program 300 penetrates the protection function to access the contents of the voucher 400; for an encryption scheme, the first and second information 302 and 304 are preferably used to produce an appropriate decryption key. Based on the contents of the voucher, and particularly the access polices and time frame, the viewing tool 104 determines whether the user 116 has access to the document 112. By way of non-limiting example, the remote access program 300 may deny access due to by way of non-limiting example, the absence of the key 118, and/or the operating conditions do not satisfy the access policies. The viewing tool 104 preferably advises the viewing user 116 if authorization is lacking.

If the user 116 is authorized and access is otherwise proper, the viewing tool 104 receives a copy of the decrypted decryption key 118 from remote access program 300. Preferably, the viewing tool 104 will use the key 118 in the same manner as if the key 118 had been received from the remote server 106, i.e., decrypt the encrypted document 112 using the decryption key 118, destroy the decrypted copy of key 118 (and preferably the decrypted version of voucher 400 as well), load the text of the resulting decrypted document 120 into the display buffers to render the text to the screen, and clear the display buffers to destroy the decrypted document 120.

During the above process, the protected voucher 400 preferably remains in the memory of the viewing tool 104, while the system uses a read copy of the voucher 400. Destruction of the decrypted decryption key 118 therefore does not effect the protected voucher 400 or the contents thereof. An authorized user can thus repeatedly obtain the key 118 for viewing the segment.

The remote access program 300 logs the above actions to create a record for later analysis. Activities relating to the encrypted document (e.g., when decrypted, read, printed, etc.) can also be logged for later analysis. When the system later reconnects to the remote server 106, the remote access program 300 uploads these logs into a master database. Each log event preferably includes a timestamp, and is digested and signed to identify any tampering with the log.

Preferably, the leased decryption key(s) 118 has a limited lifespan, and is rendered inaccessible (either destroyed or otherwise rendered unusable) after a certain period of time. To the extent that the access policies include time limitations, then the system would prevent access to the contents of voucher 400 outside an authorized time frame. The remote access program 300 could destroy the protected voucher 400 after an expiration of a time period, preferably the lease period. After the viewing tool 104 reconnects with the remote server 106, the remote server 106 could also instruct the viewing tool to destroy the voucher 400 if it detects the presence of an expired voucher 400 or evidence of tampering.

The viewing tool 104 could periodically check each voucher 400 and delete those with expired lease periods; the lease period could be in the protected portion of the voucher 400 (such that the viewing tool 104 would have to access at least that portion of voucher 400), or be in an unprotected portion thereof. In another example, the viewing tool 104 can rely upon a time period based on the date the voucher 400 was received and simply delete the voucher 400 sometime thereafter (e.g., 90 days) without otherwise accessing the protected voucher 400.

Viewing tool 104 and/or remote access program 300 preferably either prevent tampering with local clock of the viewing tool 104, or to detect any such tampering. By way of non-limiting example, sequential log entries define a time line, such that tampering with the clock could produce a log entry that is out of place relative to other entries. The remote access program 300 could also enter a log entry consistent with the time limitations; for example, if the last log entry is the expiration of the voucher 400, then a subsequent log entry showing an access of the voucher 400 at a time before the expiration would indicate that the clock has been tampered with. Upon detection of the tampering, the viewing tool 104 or the remote server 106 can render the affected voucher, or all vouchers, inaccessible.

One or more preferred embodiments have been described to illustrate the invention(s). Additions, modifications, and/or omissions may be made to the preferred embodiment(s) without departing from the scope or spirit of the invention(s). It is the intent that the following claims encompasses all such additions, modifications, and/or variations to the fullest extent permitted by law.

In the preferred embodiment discussed above, only a single key 118 is associated with the document 112. However, a single document 112 may have different keys 118, access policies, and time frames associated with different sections of the document 112. These different keys, policies and times may be combined in a single voucher 400 associated with the document, or distributed amongst several vouchers 400. If in a single voucher 400, the remote access program 300 could access the entire voucher 400 to obtain the keys, policies, and time frame for a particular portion, or access only a limited portion of the voucher 400 (thereby leaving the remainder of the voucher 400 protected).

In another non-limiting example, in the preferred embodiment, the entire voucher 400 is accessible when the remote access program 300 is checking whether access to the key(s) 118 is proper in view of the access policies and time frames in voucher 400. This may leave the now unprotected key(s) 118 vulnerable during the access procedure. As an additional layer of security, program 300 may limit initial access to only the policies and/or the time frame (i.e., the key(s) 118 remain protected) until authorization is confirmed.

In yet another non-limiting example, the access policies may include geographical constraints. An appropriate location device (e.g., GPS or LORAN receiver) can be used with viewing tool 104 (either as a integral part or external device) to provide geographical position data that can be compared with geographically based access policies.

Applicants note that the appended claims may recite the above in terms of "responsive to" and "in response to." Unless otherwise indicated, Applicants intend such language to include both a direct response (i.e., A triggers B) and an indirect response (A triggers B, and B triggers C, etc.).

Applicants note that the appended claims may recite the above in terms of "a copy" of a key. Unless otherwise indicated, this refers to the fact that at least two keys would exist—the original key in the voucher (which is typically saved in protected and/or encrypted format), and the "copy" of the key (which is typically an unprotected and/or decrypted version of the original key) ultimately used to access the associated protected/encrypted information. Other intermediate version of the key may exist without departing from the scope and spirit of the invention.

What is claimed is:

1. A method of controlling distribution of a segment of encrypted electronic information, comprising:
   receiving, from a key server, a protected decryption key associated with the segment;
   retrieving, at a user location, the segment;
   obtaining an unprotected copy of the decryption key from the protected decryption key;
   decrypting, in response to said obtaining, the segment using the unprotected copy of the decryption key;
   destroying the unprotected copy of the decryption key at the user location in response to said decrypting;
   displaying the decrypted segment in response to said decrypting; and
   destroying the decrypted segment in response to said displaying.

2. The method of claim 1, further comprising:
   saving, in response to said receiving, the protected decryption key;
   wherein said destroying the unprotected copy of the decryption key does not effect the protected copy of the decryption key.

3. The method of claim 1, further comprising:
   said receiving further comprising receiving at least one access policy associated with at least one of the key server, the user location, the segment, the decryption key, and a user, the at least one access policy including at least one fixed time limitation;
   said determining comprising determining whether current operating conditions, including the current time, satisfy the at least one access policy.

4. The method of claim 1, further comprising:
   saving, in response to said receiving, the protected decryption key in memory; and
   rendering the protected copy of the decryption key inaccessible after an expiration time in the at least one access policy.

5. The method of claim 1, further comprising:
   logging said obtaining in a log; and
   sending, from the user location to a remote server, the log.

6. The method of claim 5, further comprising logging a time of said obtaining in the log.

7. A method of controlling distribution of electronic information, comprising:
   sending, from a user location to a key server, a request to access a protected segment, and a first information;
   receiving, at the user location from the key server, an encrypted voucher and a second information, said voucher including at least a decryption key associated with the segment;
   retrieving, at a user location, the segment;
   obtaining a decrypted copy of the decryption key using the first and second information;
   accessing, in response to said decrypting, the segment using the at least a portion of the voucher;
   destroying, in response to said accessing, the decrypted copy of the decryption key.

8. The method of claim 7, further comprising:
   displaying the accessed segment in response to said accessing; and
   destroying the accessed segment in response to said displaying.

9. The method of claim 7, wherein the voucher includes access policies, the method further comprises:
   determining, in response to said decrypting, whether operating parameters satisfy the access policies; and
   said accessing being responsive to said operating parameters being determined to satisfy the access policies;
   wherein said accessing is responsive to said decrypting through said determining.

10. A method for controlling distribution of electronic information, comprising:
    retrieving, at a user location, a segment of encrypted electronic information;
    receiving, from a key server, an encrypted decryption key for the segment;
    saving said encrypted decryption key in a memory;
    obtaining a decrypted copy of the decryption key in response to an authorized user request to access the segment;
    accessing the segment using the decrypted copy of the decryption key at the user location for the segment; and
    destroying the decrypted copy of the decryption key at the user location in response to said accessing without destroying the encrypted decryption key in memory.

11. The method of claim 10, further comprising:
    displaying the decrypted segment in response to said accessing; and
    destroying the decrypted segment in response to one of said displaying.

12. A method of accessing a protected segment of electronic information, the segment having an associated key, comprising:
    retrieving, at the user location, the segment;
    receiving, at the user location from the remote server, the key;
    accessing the segment, in response to said receiving, using the key;
    displaying the segment as accessed;
    destroying the key in response to one of said displaying and said accessing, wherein the key is momentarily stored in memory at a user location between said receiving and said destroying;
    receiving, at the user location from the remote server, an encrypted key lease including the key;
    saving the encrypted key lease in a memory;
    breaking a connection between the user location and the remote server; and
    during a period of the broken connection:
    retrieving, at the user location, the segment;
    obtaining a decrypted copy of the key from the key lease;
    accessing the segment in response to said obtaining;
    displaying the segment as accessed; and
    destroying the decrypted copy of the key in response to one of said displaying and said accessing.

13. The method of claim 12, further comprising restoring a connection between the user location and the remote server.

14. The method of claim 13, further comprising revoking the key lease after said restoring.

15. The method of claim 13, further comprising:
logging said obtaining in a log; and
sending, after said restoring, the log from the user location to the remote server.

16. The method of claim 15, further comprising detecting, at one of the user location and the remote server, from the contents of the log, any tampering at the user location relating to at least one of the key lease, the segment, and operating conditions at the user location.

17. A method of viewing a segment of encrypted electronic information on a display, comprising:
receiving, from a remote server, an encrypted decryption key for the segment;
retrieving, at a user location, a segment of encrypted electronic information;
first decrypting the encrypted decryption key in response to the presence of authorized conditions;
second decrypting the segment using the decrypted decryption key;
destroying, at the user location, all copies of the decrypted decryption key in response to said second decrypting, without destroying the encrypted decryption key;
displaying the segment as decrypted on the display; and
destroying, at the user location, the segment as decrypted in response to said displaying.

18. A method of controlling distribution of a segment of encrypted electronic information, the segment having a first and second portion, the method comprising:
receiving, from a key server, an encrypted voucher, the voucher including first and second decryption keys associated with the first and second portions, respectively,
retrieving, at a user location, the segment;
accessing the protected copy of the first decryption key;
decrypting, in response to said accessing, the first portion of the segment using the accessed copy of the first decryption key;
destroying the accessed copy of the first decryption key at the user location in response to said decrypting;
displaying the decrypted segment in response to one of said decrypting and said destroying;
destroying the decrypted first portion in response to said displaying;
accessing the protected copy of the second decryption key after said destroying the first decrypted segment; and
decrypting, in response to said accessing the protected copy of the second decryption key, the second portion of the segment using the accessed copy of the second decryption key.

19. A method of limiting access to a segment of encrypted information, comprising:
saving, at a remote server, a decryption key for the segment, the segment being at a location other than the remote server;
receiving a request from an authorized user for the decryption key;
sending a copy of the decryption key from the remote server to a source of the request;
destroying the decryption key at the remote server in response to the elapse of a predetermined period of time; and
preventing the source from retaining the copy of the decryption key, wherein said destroying leaves said segment permanently inaccessible absent breaking of the encryption protecting of the segment.

20. A system for accessing a protected segment of electronic information, comprising:
means for receiving, from a key server, a protected decryption key associated with said segment;
means for retrieving, at a user location, said segment;
means for obtaining an unprotected copy of said decryption key from said protected decryption key;
means for decrypting, in response to said obtaining, said segment using said unprotected copy of said decryption key;
means for destroying said unprotected copy of said decryption key at said user location in response to said decrypting;
means for displaying said decrypted segment in response to said decrypting; and
means for destroying said decrypted segment in response to said displaying.

21. The method of claim 20, further comprising:
means for saving, in response to said receiving, said protected decryption key;
wherein said means for destroying said unprotected copy of said decryption key does not effect said unprotected copy of said decryption key.

* * * * *